United States Patent [19]

Chattha

[11] 4,418,182

[45] Nov. 29, 1983

[54] HIGH SOLIDS COATINGS FROM NEW TETRAHYDROXY OLIGOMERS

[75] Inventor: Mohinder S. Chattha, Livonia, Mich.

[73] Assignee: Ford Motor Company, Dearborn, Mich.

[21] Appl. No.: 334,800

[22] Filed: Dec. 28, 1981

[51] Int. Cl.$^3$ .................... C08L 67/02; C08L 63/02
[52] U.S. Cl. .................... 525/438; 525/110; 525/514; 525/533; 528/112; 528/297; 427/410
[58] Field of Search ............ 525/438, 514, 533, 110; 528/112, 297

[56] References Cited

U.S. PATENT DOCUMENTS

| | | | |
|---|---|---|---|
| 3,173,971 | 3/1965 | Roth et al. | 525/514 |
| 3,553,284 | 1/1971 | Reimhofer | 525/514 |
| 3,600,459 | 8/1971 | Vasta | 525/438 |
| 3,719,725 | 3/1973 | Murakami et al. | 525/443 |
| 3,849,383 | 11/1974 | Fetscher | 525/438 |
| 3,960,979 | 6/1976 | Khanna | 525/514 |
| 3,992,346 | 11/1976 | Hartmann | 525/438 |
| 4,169,825 | 10/1979 | Yapp | 525/438 |
| 4,196,270 | 4/1980 | Chattha | 525/514 |
| 4,316,940 | 2/1982 | Thornley | 525/438 |

*Primary Examiner*—Theodore E. Pertilla
*Attorney, Agent, or Firm*—Lorraine S. Melotik; Roger L. May

[57] ABSTRACT

A novel tetrahydroxy oligomer crosslinkable with amine-aldehyde resins to form a coating composition adapted for use as an automotive topcoat and which upon curing forms a hard, glossy, coating with outstanding durability and excellent resistance to solvents and water. The coating composition comprises:

(A) a tetrahydroxy oligomer having a number average ($\overline{M}n$) molecular weight of between about 600–2000 and being the reaction product of:
 (i) an ester containing pendant hydroxyl and carboxyl functionality and being made by a reaction wherein the reactants consist essentially of:
  (a) a $C_3$–$C_{10}$ aliphatic diol, and
  (b) an alkyl hexahydrophthalic anhydride, wherein (a) and (b) are combined in the reaction mixture in an amount sufficient to allow reaction in about a 1:1 molar ratio; and
 (ii) a diepoxide having a number average molecular weight between about 130–1500, wherein (i) and (ii) are combined in the reaction mixture in an amount sufficient to allow reaction in about a 2:1 molar ratio, (B) an amine-aldehyde crosslinking agent;
(C) optionally a hydroxy functional additive; and
(D) solvent. The amine aldehyde crosslinking agent is included in the composition in an amount sufficient to provide at least about 0.60 equivalents of nitrogen crosslinking functionality for each equivalent of hydroxyl functionality included in the composition either on the tetrahydroxy oligomer or as a hydroxyl group of the hydroxy functional additive.

26 Claims, No Drawings

HIGH SOLIDS COATINGS FROM NEW TETRAHYDROXY OLIGOMERS

Reference is made to commonly assigned and concurrently filed U.S. application Ser. Nos. 334,685 entitled "New polyhydroxy Oligomers for High Solids Coatings I", Ser. No. 334,801 entitled "New Polyhydroxy Oligomers for High Solids Coatings II", Ser. No. 334,686 entitled "New High Solids Urethane Coatings I", Ser. No. 334,802 entitled "New High Solids Urethane Coatings II", Ser. No. 334,799 entitled "High Solids Urethane Coatings from New Tetrahydroxy Oligomers", all to Chattha.

This invention relates to novel coating compositions. More particularly, the invention relates to high solids thermosetting coating compositions which are adapted to provide an automotive topcoat demonstrating hardness, high gloss, outstanding durability and excellent resistance to solvents and water, and which comprises novel tetrahydroxy oligomers crosslinkable with amine-aldehyde resins. Most particularly, this invention relates to high solid compositions wherein the novel tetrahydroxy oligomers are made by first reacting a low molecular weight branched diol with an alkyl hexadhydrophthalic anhydride to form a hydroxy acid ester which is subsequently reacted with a low molecular weight diepoxide.

BACKGROUND OF THE INVENTION

Because of increasingly strict solvent emissions regulations in recent years, low solvent emission paints have become very desirable. A number of high solids paint compositions have been proposed to meet these low solvent emission requirements. However, many of these compositions are deficient because of difficulty in application, slow curing rates, lack of flexibility, poor durability and low solvent and water resistance.

The coating compositions of this invention combine the above discussed desired properties and low application viscosity so as to overcome deficiencies of previously proposed high solids materials. In particular, these low viscosity high solids coating compositions exhibit weathering properties superior to other single component high solids paints making them ideally suitable for automotive topcoats, clear or pigmented, including metallic flake.

BRIEF DESCRIPTION OF THE INVENTION

The thermosetting coating composition of this invention preferably contains greater than about 60% by weight, more preferably greater than 70% by weight, of nonvolatile solids, and exhibits superior weathering to other high solids single component paints. The composition comprises:

(A) a tetrahydroxy oligomer having a number average ($\overline{M}_n$) molecular weight of between about 600–2000 and being the reaction product of:
  (i) an ester containing pendant hydroxyl and carboxyl functionality and being made by reacting:
    (a) a $C_3$–$C_{10}$ aliphatic branched diol and
    (b) an alkyl hexadhydrophthalic anhydride, wherein (a) and (b) are combined in the reaction mixture in an amount sufficient to allow reaction in about a 1:1 molar ratio; and
  (ii) a diepoxide having a number average molecular weight between about 130–1500, wherein (i) and (ii) are combined in the reaction mixture in an amount sufficient to allow reaction in about a 2:1 molar ratio;

(B) an amine-aldehyde crosslinking agent;

(C) 0–50 weight percent based on the total weight of (A), (B), (C), and (D) of a hydroxy functional additive having a number average molecular weight ($\overline{M}_n$) of between about 300–5000, preferably between about 500–2500; and (D) solvent.

The amine-aldehyde crosslinking agent is included in the composition in an amount sufficient to provide at least about 0.60, preferably between about 0.75 and 3.75, equivalents of nitrogen crosslinking functionality per equivalent of hydroxyl functionality included in the composition either on the tetrahydroxy oligomer or as a hydroxyl group of the hydroxy functional additive. The oligomers of this composition are compatible, in particular, with low molecular weight hydroxy functional acrylics. In addition, the high solids coating composition of this invention may include additives such as catalysts, antioxidants, U.V. absorbers, flow control or wetting agents, antistatic agents, pigments, plasticizers, etc. The oligomers of this composition are also compatible with nonaqueous dispersions (NAD's), which are generally used as flow control additives.

The invention is also directed to the oligomer of the coating composition taught above.

DETAILED DESCRIPTION OF THE INVENTION

The coating composition of this invention provide a system which is particularly suitable for those applications requiring a coating having high gloss, hardness, durability and high solvent and water resistance as well as low temperature cure. The desirable characteristics of the coating composition of this invention, in particular the excellent physical properties and weatherbility, are believed to result from the steric hinderance to hydrolysis afforded the ester groups of the oligomer by the alkyl group of the anhydride. However, while this theory has been advanced, to explain the excellent durability of this coating composition, neither its validity nor its understanding is necessary for the practice of the invention.

Each of the components of the coating composition, the amounts of each of the components required to achieve the desired results of the invention and a method for applying the composition are described hereinafter in greater detail.

Tetrahydroxy Oligomer

A principal material in the coating composition of this invention is a novel tetrahydroxy oligomer having a number average molecular weight ($\overline{M}_n$) between about 600 and about 2000, more preferably between about 700 and about 1500. The oligomer is prepared by first combining a low molecular weight $C_3$–$C_{10}$ aliphatic branched diol with an alkyl hexadhydrophthaic anhydride in the reaction mixture in an amount sufficient to allow reaction in about a 1:1 molar ratio to form an ester having pendant hydroxyl and pendant carboxyl functionality. A slight excess of anhydride than needed for this reaction may be used. This ester is subsequently reacted with a diepoxide: the ester and the diepoxide being combined in the reaction mixture in an amount sufficient to allow reaction in about a 2:1 molar ratio, forming the oligomer. By means of this reaction, the carboxyl of the ester opens the epoxide groups of the diepoxide generating two more hydroxyl functionalities.

The aliphatic branched diol preferably contains only one primary hydroxyl group, the second hydroxyl of the diol is therefore preferable a secondary or tertiary hydroxyl, more preferably a secondary hydroxyl. Additionally it is preferable that the hydroxyl groups not be on adjacent carbons and more preferably be separated by at least three carbon atoms. The carbon chain may also be interrupted or substituted by non-interfering functionality. Suitable $C_3$–$C_{10}$ aliphatic branched diols include but are not limited to, 2-ethyl-1,3-hexane diol, 1,3-butanediol and 1,2-butane-diol with 2-ethyl-1,3-hexanediol being most preferred. Other suitable diols will be apparent to one skilled in the art. Mixtures of suitable diols can also be used.

The alkyl hexahydrophthalic anhydride preferably contains a lower alkyl group, i.e., an alkyl group having about up to seven carbons, more preferably, up to about four carbons. Additionally, the alkyl group may be substituted by non-interfering functionality. Suitable anhydrides useful in this invention include methyl hexahydrophthalic anhydride, and its ethyl and propyl analogs, with methyl hexahydrophthalic anhydride being most preferred.

The diepoxide suitable for use in this invention is a low molecular weight epoxy containing two epoxide groups per molecule and has a number average molecular weight of between about 130–1500. This diepoxide can be a liquid or a solid and can be either a single diepoxide or a mixture of suitable diepoxides. Examples of suitable diepoxides include but are not limited to condensation products of bisphenol-A with epichlorohydrin, examples of which are commercially available as Epon 828, 1001, 1004, 1007 and 1009 (marketed by Shell Oil Company), Araldite 6010 and 8001 (marketed by Ciba-Geigy); ester-type diepoxides such as diglycidyl phthalate, diglycidyl adipate, and diglycidyl glutarate; cycloaliphatic diepoxides such as cyclopentanediene and vinyl cyclohexane dioxide; and aliphatic ether type diepoxides such as ethylene glycol diglycidyl ether, 1,2-propylene glycol diglycidyl ether and 1,4 butanediol diglycidyl ether (Araldite RD-2 marketed by Ciba-Geigy).

In preparing the tetrahydroxy oligomer, the diol and anhydride are combined, generally by adding the anhydride dropwise to the heated diol, and then reacted at an elevated temperature for a time necessary to complete the esterification reaction. Subsequently, the diepoxide is reacted with the ester composition, generally in the presence of a catalyst, and the composition is maintained at elevated temperatures until the reaction between the hydroxy acid ester and diepoxide is complete. Preferred carboxyl/epoxide catalysts useful in preparation of hydroxy functional oligomer are the tetralkyl ammonium salts such as tetra methyl ammonium chloride, tetraethyl ammonium bromide and trimethyl benzyl ammonium chloride as well as metal salts of a carboxylic acid, such as potassium octoate or chromium III octoate. Other useful catalysts include: metal halides such as chromium trichloride, ferric trichloride, and aluminum trichloride; mercaptans and thioethers such as octyl mercaptan, dimercapto propanol and dimercapto-diethyl ether; tertiary amines such as triethyl amine, pyridine, dimethylaniline, quinoline, β-picoline, ethylpyridine; and the like. Still another catalyst known to catalyze carboxy/epoxy reactions will be apparent to those skilled in this art.

Various mixtures of these types of oligomers may also be employed within the scope of the compositions of the invention described herein.

Although the above reactions may be carried out with or without solvent, it is generally suitable and preferable in order to achieve the preferred high solids concentration of the coating composition to use little or no solvent. However, when desirable, suitable solvents which may be employed include those commonly used, such as toluene, xylene, methyl amyl ketone etc. It is however necessary to incorporate solvent into the coating composition in order to facilitate application of the coating composition. Typically solvents useful in the coating composition to facilitate application, for example spray application at high solids content, include those commonly employed, such as toluene, xylene, methyl amyl ketone, acetone, dioxane, butanone, 2-butoxyl-1-ethanol, diacetone alcohol, tetrahydrofuran, butyl acetate, cellosolve acetate, dimethyl succinate, dimethyl glutarate, dimethyl adipate or mixtures thereof. The solvent in which the tetrahydroxy functional oligomer of the coating composition may be prepared, may be employed as the solvent for the coating composition thus eliminating the need for drying the oligomer after preparation, if such is desired. As mentioned above, the nonvolatile solids content of the high solids coating composition is preferably at least 60% and more preferably 70% or more, thus limiting the amount of solvent included in the composition. However, while the tetrahydroxy oligomer of the subject composition are particularly suitable for making high solids coatings, they are also suitable in compositions that are not high solids compositions. Determination of optimal solids content (with the corresponding solvent content) for a given application would be within the skill of one in the art.

Amino Crosslinking Agent

A second essential component of the paint compositions of this invention is an amine-aldehyde crosslinking agent. Amine-aldehyde crosslinking agents suitable for crosslinking hydroxy functional bearing materials are well known in the art. Typically, these crosslinking materials are products of reactions of melamine, or urea with formaldehyde and various alcohols containing up to and including 4 carbon atoms. Preferably, the amine-aldehyde crosslinking agents useful in this invention are amine-aldehyde resins such as condensation products of formaldehyde with melamine, substituted melamine, urea, benzoguanamine or substituted benzoguanamine. Preferred members of this class are methylated melamine-formaladehyde resins such as hexamethoxymethylmelamine. These liquid crosslinking agents have substantially 100 percent nonvolatile content as measured by the foil method at 45° C. for 45 minutes. For the purposes of the preferred high solids coatings of the invention it should be recognized that it is important not to introduce extraneous diluents that would lower the final solids content of the coating. Other suitable amine-aldehyde crosslinking agents would be apparent to one skilled in the art.

Particularly preferred crosslinking agents are the amino crosslinking agents sold by American Cyanamid under the trademark "Cymel." In particular, Cymel 301, Cymel 303, Cymel 325 and Cymel 1156, which are alkylated melamine-formaldehyde resins are useful in the compositions of this invention.

The crosslinking reactions are generally catalytically accelerated by acids. One such catalyst, for example, which may be so employed is p-toluene sulfonic acid, generally added to the composition in about 0.5% by weight based on the total weight of ester and crosslinking agent.

The amine-aldehyde materials function as a crosslinking agent in the composition of the invention by reacting with the hydroxyl functionality of the tetrahydroxy oligomer and by reaction with the hydroxyl functionality on the hydroxy functional additive if such material is included in the composition.

In order to achieve the outstanding properties which make these coating compositions particularly useful an automotive topcoat materials, it is essential that the amount of amino crosslinking agent be sufficient to substantially completely crosslink the hydroxy functionality in the coating composition. Therefore, the amino crosslinking agent should be included in the composition in an amount sufficient to provide at least about 0.60 equivalents, preferably between about 0.75 and about 3.75 equivalents, of nitrogen crosslinking functionality for each equivalent of hydroxyl functionality included in the composition either as a hydroxyl group on the optional hydroxy functional additive or on the tetrahydroxy oligomer.

Optional Hydroxy Functional Additive

Additional hydroxy functionality other than that present on the tetrahydroxy oligomer may be achieved by adding a hydroxy functional additive in amounts up to about 50 weight percent based on the total of the three above discussed components and the hydroxy functional additive itself. Such a material serves to provide additional hydroxy functional additives so as to provide a more intimate crosslinked structure in the final cured product. The hydroxy functional additives useful in the composition are preferably selected from various polyols having a number average molecular weight ($\overline{M}_n$) of between about 150 and about 6000, preferably between about 400 and about 2500. As used herein the term polyol means a compound having two or more hydroxyl groups.

The polyols useful in the invention preferably are selected from the group consisting of: (i) hydroxy functional polyesters; (ii) hydroxy functional polyethers; (iii) hydroxy functional oligoesters, (iv) monomeric polyols; (v) hydroxy functional copolymers produced by free radical polymerization of monoethylenically unsaturated monomers, one of which bears hydroxy functionality and which is included in the copolymer in an amount ranging from about 10 to about 50 weight percent, and (vi) mixtures of (i)-(v).

U.S. Pat. No. 4,181,784 to Chattha et al teaches a high solids paint composition comprising an optional hydroxy functional additive. This patent is hereby expressly incorporated by reference as detailing hydroxy functional additives which are suitable for use as such in the composition of this invention. The following presents a brief description of the optional hydroxy functional additives.

The hydroxy functional polyesters useful in the invention are preferably fully saturated products prepared from aliphatic dibasic acids containing 2-20 carbon atoms, and short chain glycols of up to and including 21 carbon atoms. The molecular weight of these materials ranges from about 200 to about 2500 and the hydroxyl number ranges from about 30 to about 230.

Among preferred polyesters are products derived from esterification of ethylene glycol and 1,4 butane diol with adipic acid, ethylene glycol and 1,2 propylene glycol with adipic acid, azelaic acid and sebacic acid copolyester diols and mixtures thereof.

Among useful polyether diols are polytetramethylene ether glycol, polyethylene glycol, polypropylene glycol and the like.

The hydroxy functional oligoesters useful as hydroxy functional additives in the compositions of the invention are oligoesters preferably having a molecular weight of between about 150 and about 300. Such oligoesters may be selected from the group consisting of: (i) oligoesters prepared by reacting a dicarboxylic acid with a monoepoxide such as an alkylene oxide; (ii) oligoesters prepared by reacting a polyepoxide with a monocarboxylic acid; and (iii) oligoesters prepared by reacting a hydroxy functional monocarboxylic acid with either a mono- or polyepoxide.

Oligoester (i) prepared by reacting a dibasic carboxylic acid with a monoepoxide, preferably include those formed by reacting $C_6$–$C_{12}$ dicarboxylic aliphatic acids with ethylene oxide or propylene oxide.

The preparation of oligoesters from carboxylic acids and polyepoxides is well known and is described, for example, in U.S. Pat. Nos. 2,456,408 and 2,653,141. Numerous hydroxy functional oligoesters within this general category will be apparent to those skilled in the art.

The third type of hydroxy functional oligoester, i.e., those prepared by reaction of a hydroxy functional monocarboxylic acid with an epoxide is described in U.S. Pat. No. 3,404,018. While the epoxides employed in accordance with the teachings of that patent are polyepoxides, oligoesters may be prepared in a similar manner to that described therein by employing a monoepoxide, such as an alkylene oxide, and a hydroxy functional monocarboxylic acid as described therein.

Among the numerous monomeric polyols which may be employed as the hydroxy functional additive are the various short chain glycols of up to and including 21 carbon atoms which are useful in preparing the hydroxy functional polyesters discussed above. Other conventional polyhydric alcohols such as glycerols and sugar alcohols are also among the numerous monomeric polyols which will be apparent to those skilled in the art.

The hydroxy bearing copolymer useful as the hydroxy functional additive may be formed from monoethylenically usaturated monomers, with between about 10 and about 50 weight percent bearing hydroxyl functionality.

Although one of ordinary skill in the art will recognize that many different hydroxy bearing monomers could be employed, the preferred hydroxy functional monomers for use in the hydroxy functional resin of the invention are $C_5$–$C_7$ hydroxy alkyl acrylates and/or $C_6$–$C_8$ hydroxy alkyl methacrylates, i.e., esters of $C_2$–$C_4$ dihydric alcohols and acrylic or methacrylic acids.

The remainder of the monomers forming the hydroxy functional copolymer, i.e., between about 90 and about 50 weight percent of the monomers of the copolymer, are other monoethylenically unsaturated monomers. These monoethylenically unsaturated monomers are preferably alpha-beta olefinically unsaturated monomers, i.e., monomers bearing olefinic unsaturation between the two carbon atoms in the alpha and beta positions with respect to the terminus of an aliphatic carbon-to-carbon chain.

Other Materials

In addition to the above discussed components, other materials may be included in the coating compositions of the invention. These include materials such as catalysts, antioxidants, U.V. absorbers, surface modifiers and wetting agents as well as pigments.

Surface modifiers or wetting agents are common additives for liquid paint compositions. The exact mode of operation of these surface modifiers is not known, but it is thought that their presence contributes to better adhesion of the coating composition to the surface being coated and helps formation of thin coatings, particularly on metal surfaces. These surface modifiers are exemplified by acrylic polymers containing 0.1-10 percent by weight of a copolymerized monoethylenically unsaturated carboxylic acids such as methacrylic acid, acrylic or itaconic acid, cellulose acetate butyrate, silicon oils or mixtures thereof. Of course, the choice of surface modifiers or wetting agent is dependent upon the type of surface to be coated and selection of the same is clearly within the skill of the artisan.

The coating composition of the invention also may include pigments. As noted above, the compositions of this invention may include metallic flake as a pigment. The amount of pigment in the coating composition may vary, but preferably is between about 3 and about 45 weight percent based on the total weight of the paint composition. If the pigment is metallic flake, the amount ranges from about 1 to about 20 weight percent.

For many application of the coating composition of the invention, particularly high solids composition, it may be desirable to employ flow control additives to provide sag free coatings. Among numerous such materials NAD's such as described by Porter (S. Porter, Jr., and B. N. McBane, U.S. Pat. No. 4,025,474, May 24, 1977) are compatible with these oligomers coating compositions. These particle dispersions may be included in an amount up to 15% by weight of the total composition. Other types of NAD's such as described by D. L. Maker and S. C. Peng (U.S. Pat. No. 3,814,721, June 4, 1974) also may be included in the paint composition.

Application Techniques

The coating composition can be applied by conventional methods known to those in the art. These methods include roller coating, spray coating, dipping or brushing and, of course, the particular application technique chosen will depend on the particular substrate to be coated and the environment in which the coating operation is to take place.

A particularly preferred technique for applying the high solids coating compositions, particularly when applying the same to automobiles as topcoats, is spray coating through the nozzle of a spray gun.

High solids paints have in the past caused some difficulty in spray coating techniques because of the high viscosity of the materials and resultant problems in clogging of spray guns. However, because the compositions of this invention demonstrate relatively low viscosity considering the high solids content they can be applied by spray coating techniques.

The invention will be further understood by referring to the following detailed examples. It should be understood that the specific examples are presented by way of illustration and not by way of limitation. Unless otherwise specified, all references to "parts" is intended to mean parts by weight.

EXAMPLE 1

2-ethyl-1,3-hexanediol (2920 g) is placed in a 12 liter flask and is heated to 100° C. Methyl-hexahydrophthalic anhydride (3360 g) is added dropwise with continuous stirring, while maintaining the temperature at about 100° C. The reaction mixture is stirred at this temperature for two hours and then 2680 g 1,4-butane diol diglycidyl ether (Araldite RD-2, Ciba-Geigy Corp) containing three grams of Cordova Accelerator AMC TM-2 (Cordova Chemical Company) is added dropwise with continuous stirring. After the addition is complete, the reaction mixture is stirred at 100° C. for three hours and then it is heated at 165° C. for four hours. The molecular weight of the resulting product from gel permeation chromatography is found to be $\overline{M}_n = 410$, $\overline{M}_w = 807$.

Sixty two (62) parts of the above hydroxy oligomer and 39 parts of Cymel 301 (American Cyanamid) are dissolved in 36 parts of butyl acetate and one gram of a 50% solution of p-toluene sulfonic acid in 2-proponal are added to it. The resulting formulation is applied by spraying to primed steel panels to obtain coatings with excellent hardness, adhesion and solvent (xylene and methyl ethyl ketone) resistance.

EXAMPLE 2

Thirty (30) parts of the hydroxy oligomer from Example 1 are mixed with five parts of aluminum flakes (65% in naphtha) in 21 parts of butyl acetate. Twenty-one (21) parts of Cymel 325 (American Cyanamid), four parts of cellulose acetate and 0.3 parts of butyl acid phosphate are added to the above mixture; the resulting formulation is applied by spraying to primed steel panels. The panels are baked at 130° C. for 18 minutes to obtain silver metallic coatings with excellent hardness, adhesion and solvent (xylene and methyl ethyl ketone) resistance.

EXAMPLE 3

One hundred and twenty parts of the oligomer from Example 1 are dissolved in 145 parts of methyl amyl ketone and 425 parts of titanium dioxide are added under agitation to this solution. The resulting mixture is whipped with a Cowl's blade at 90 cycles per second for 20 minutes to obtain Hegman grind fineness of 7.5.

Fifty-two parts of the above millbase, 29 parts of the oligomer from Example 1, and 23 parts of Cymel 301 (American Cyanamid) are mixed with 25 parts of butyl acetate. A 50% solution (0.4 parts) of p-toluene sulfonic acid in 2-propanol is added to the above mixture and the resulting formulation is applied by spraying to primed steel panels. The panels are baked at 125° C. for 20 minutes to obtain coatings with excellent hardness, adhesion and solvent (xylene and methyl ethyl ketone) resistance.

EXAMPLE 4

Seven parts of caprolactone based hydroxy ester PCP-0300 (Union Carbide), 4 parts of hexabutoxymethyl melamine (Cymel 1156, American Cyanamid) and 6 parts of xylene are added to the formulation described in Example 1. The resulting formulation is applied by spraying to primed steel panels which are baked at 135° C. for 18 minutes to obtain coatings with excellent hardness, adhesion, gloss and solvent (xylene and methyl ethyl ketone) resistance.

EXAMPLE 5

Nine parts hydroxy polymer Acryloyd OL-42 (Rohm and Haas Chemical Co.) and six parts of ethoxymethoxy benzoguanamine (Cymel 1123, American Cyanamid) and five parts of methyl amyl ketone are added to the formulation described in Example 1. The resulting formulation is applied by spraying to primed steel panels which are baked at 135° C. for 17 minutes to obtain hard, glossy coatings with excellent adhesion and solvent (xylene and methyl ethyl ketone) resistance.

EXAMPLE 6

A hydroxy acrylic polymer ($\overline{M}_n$=2200) is prepared by solution polymerization technique in methyl amyl ketone (60% solids by weight) comprising hydroxyethyl acrylate (30%) isobutyl methacrylate (45%) and styrene (25%).

Fifteen parts of this polymer, five parts Cymel 301 and three parts of butyl acetate are added to the formulation described in Example 1. The resulting formulation is applied by spraying to primed steel panels which are baked at 132° C. for 18 minutes to obtain coatings with excellent hardness, adhesion and solvent resistance.

EXAMPLE 7

By following the procedure described in Example 1, hydroxy oligomer is prepared from 168 grams methylhexahydrophthic anhydride, 146 grams 2-ethyl-1,3-hexanediol, 210 grams cycloaliphatic epoxy Araldite CY-178 (Ciba-Geigy Corp.) and 0.2 grams Cordova Accelerator AMC TM -2.

Sixty parts of the above product, 35 part of Cymel 301 and 0.8 part of 2-hydroxycyclohexyl p-toluene sulfonate are dissolved in 36 parts of butyl acetate. The resulting formulation is applied by spraying to primed steel panels which are baked at 135° C. for 20 minutes to obtain coatings with excellent hardness, adhesion, gloss and solvent (xylene and methyl ethyl ketone) resistance.

EXAMPLE 8

Preparation of hydroxy oligomer is carried out as described in Example 1 by employing 168 grams methylhexahydrophthalic anhydride, 146 grams 2-ethyl-1,3-hexanediol, 190 grams bisphenol-A-diglycidyl ether (Epon 828, Shell Chemical Co.), 60 grams methyl amyl ketone and 0.35 grams Cordova Accelerator AMC TM -2.

Thirty-two parts of the above product and 23 parts of Cymel 325 are dissolved in 17 parts of butyl acetate and 0.38 parts of butyl acid phosphate are added to the solution. The resulting formulation is applied by spraying to a primed steel panel which is baked at 130° C. for 20 minutes to obtain a coating with excellent hardness, adhesion and solvent (xylene and methyl ethyl ketone) resistance.

EXAMPLE 9

2-ethyl-1,3-hexanediol (140 g) and methylhexahydrophthalic anhydride (168 g) are placed in a round bottom flask and heated to 100° C. and stirred at this temperature for two hours. Cordova Accelerator AMC TM -2 (0.35 g) is added to the reaction mixture followed by dropwise addition of 4-vinylcyclohexane dioxide (75 g) with continuous stirring at 100° C. The heating is continued for seven hours.

Fifty-one parts of the above product and 0.3 parts of p-toluene sulfonic acid are dissolved in 32 parts of methyl amyl ketone and 39 parts of Cymel 301 are added to the solution. The resulting formulation is applied by spraying to primed steel panels which are baked at 130° C. for 20 minutes to obtain coatings with excellent hardness, adhesion, gloss and solvent (xylene and methyl ethyl ketone) resistance.

EXAMPLE 10

Five (5) parts of nonaqueous dispersed particles (41% solids by weight), described in U.S. Pat. No. 4,025,474 Example A, are added to the composition described in Example 2. The resulting formulation is applied by spraying to primed steel panels which are baked at 128° C. for 19 minutes to obtain silver metallic coatings with excellent hardness, adhesion and solvent (xylene and methyl ethyl ketone) resistance.

In view of this disclosure, many modifications of this invention will be apparent to those skilled in the art. It is intended that all such modifications which fall within the true scope of this invention be included within the terms of the appended claims.

I claim:

1. A thermosetting coating composition adapted for low temperature bake applications comprising:
   (A) a tetrahydroxy oligomer having a number average molecular weight of between about 600–2000 and being the reaction product of:
      (i) an ester containing pendant hydroxyl and carboxyl functionality and being made by a reaction wherein the reactants consist essentially of:
         (a) a $C_3$–$C_{10}$ aliphatic branched diol and
         (b) an alkyl hexahydrophthalic anhydride, wherein (a) and (b) are combined in the reaction mixture in an amount sufficient to allow reaction in about a 1:1 molar ratio; and
      (ii) a diepoxide having a number average molecular weight between about 130–1500, wherein (i) and (ii) are combined in the reaction mixture in an amount sufficient to allow reaction in about a 2:1 molar ratio;
   (B) an amine-aldehyde crosslinking agent;
   (C) 0–50 weight percent based on the total weight of (A), (B), (C) and (D) of a hydroxy functional additive having a number average molecular weight ($\overline{M}_n$) of between about 150–6000; and
   (D) solvent,
   said amine-aldehyde crosslinking agent being included in said composition in an amount sufficient to provide at least about 0.60 equivalents of nitrogen crosslinking functionality for each equivalent of hydroxyl functionality included in said composition either on said tetrahydroxy oligomer or as a hydroxyl group of said hydroxy functional additive.

2. A high solids coating composition according to claim 1, wherein said aliphatic branched diol contains one primary hydroxyl group.

3. A coating composition according to claim 2 wherein the hydroxyl groups of said diol are not attached to adjacent carbon atoms.

4. A coating composition according to claim 3, wherein said diol is 2-ethyl-1,3-hexane diol.

5. A coating composition according to claim 1, wherein the alkyl group of said alkyl hexahydrophthalic anhydride comprises a lower alkyl group having up to about seven carbons.

6. A coating composition according to clam 4 or 5, wherein said anhydride is methyl hexahydrophthalic anhydride.

7. A coating composition according to claim 1, wherein said diepoxide is selected from the group consisting of
 (i) condensation products of bisphenol-A with epichlorohydrin, (ii) ester diepoxides, (iii) cycloaliphatic diepoxides, and (iv) mixtures of (i)-(iii).

8. A coating composition according to claim 1 wherein said amine aldehyde crosslinking agent is selected from the group consisting of condensation products of formaldehyde with melamine, substituted melamine, urea, benzoguanamine and substituted benzoguanamine, and mixtures of said condensation products in an amount sufficient to provide between about 0.75 and about 3.75 equivalents of nitrogen crosslinking functionality for each equivalent of hydroxy functionality included in said composition either on said tetrahydroxy oligomer or as a hydroxyl group of said hydroxy functional additive.

9. A composition in accordance with claim 1, wherein said hydroxy functional additive is a polyol selected from the group consisting of (i) hydroxy functional polyesters, (ii) hydroxy functional polyethers, (iii) hydroxy functional oligoesters, (iv) monomeric polyols, (v) hydroxy functional copolymers formed from monoethylenically unsaturated monomers, one or more of which bears hydroxy functionality and which is included in said copolymer in amounts ranging from about 10 to about 50 weight percent of said copolymer, and (vi) mixtures of (i)-(v).

10. A composition in accordance with claim 1, wherein said composition further comprises up to 15 weight percent based on the total weight of the composition of a flow control additive.

11. A tetrahydroxy oligomer having a number average molecular weight between about 600-2000 and being the reaction product of:
 (i) an ester containing pendant hydroxyl and carboxyl functionality and being made by reacting:
  (a) a $C_3$-$C_{10}$ aliphatic branched diol, and
  (b) an alkyl hexahydrophthalic anhydride, wherein (a) and (b) are combined in the reaction mixture in an amount sufficient to allow reaction in about a 1:1 molar ratio; and
 (ii) a diepoxide having a number average molecular weight between about 130-1500, wherein (i) and (ii) are combined in the reaction mixture in an amount sufficient to allow reaction in about a 2:1 molar ratio.

12. A tetrahydroxy oligomer according to claim 11, wherein said aliphatic branched diol contains one primary hydroxy group.

13. A tetrahydroxy oligomer according to claim 12, wherein the hydroxyl groups of said diol are not attached to adjacent carbon atoms.

14. A tetrahydroxy oligomer according to claim 13, wherein said diol is 2-ethyl-1,3-hexane diol.

15. A tetrahydroxy oligomer according to claim 11, wherein the alkyl group of said alkyl hexahydrophthalic anhydride comprises a lower alkyl group having up to about seven carbons.

16. A tetrahydroxy oligomer according to claim 14 or 15 wherein said anhydride is methyl hexahydrophthalic anhydride.

17. A tetrahydroxy oligomer according to claim 11, wherein said diepoxide is selected from the group consisting of:
 (i) condensation products of bisphenol-A with epichlorohydrin, (ii) ester diepoxides, (iii) cycloaliphatic diepoxides, and (iv) mixtures of (i)-(iii).

18. A high solids thermosetting coating composition adapted for low temperature bake applications which contains greater than about 60 percent by weight of nonvolatile solids, and which exclusive of pigments, and other nonreactive components, consists essentially of:
 (A) a tetrahydroxy oligomer having a number average molecular weight of between about 600-2000 and being the reaction product of:
  (i) an ester containing pendant hydroxyl and carboxyl functionality and being made by reacting:
   (a) a $C_3$-$C_{10}$ aliphatic branched diol and
   (b) an alkyl hexahydrophthalic anhydride, wherein (a) and (b) are combined in the reaction mixture in an amount sufficient to allow reaction in about a 1:1 molar ratio; and
  (ii) a diepoxide having a number average molecular weight between about 130-1500, wherein (i) and (ii) are combined in the reaction mixture in an amount sufficient to allow reaction in about 2:1 molar ratio;
 (B) an amine-aldehyde crosslinking agent;
 (C) 0-50 percent based on the total weight of (A), (B), (C), (D) and (E) of a hydroxy functional additive having a number average molecular weight ($\overline{M}_n$) of between about 150-6000;
 (D) solvent; and
 (E) up to 15 weight percent based on the total weight of (A),
 (B), (C), (D) and (E) of a flow control additive,
  said amine-aldehyde crosslinking agent being included in said composition in an amount sufficient to provide at least about 0.60 equivalents of nitrogen corsslinking functionality for each equivalent of hydroxyl functionality included in said composition either on said tetrahydroxy oligomer or as a hydroxyl group of said hydroxy functional additive.

19. A high solids coating composition according to claim 18, wherein said aliphatic branched diol contains one primary hydroxyl group.

20. A coating composition according to claim 19, wherein the hydroxyl groups of said diol are not attached to adjacent carbon atoms of the diol.

21. A coating composition according to claim 20, wherein said diol is 2-ethyl-1,3-hexane diol.

22. A coating composition according to claim 21, wherein the alkyl group of said alkyl hexadrophthalic anhydride comprises a lower alkyl group having up to about seven carbons.

23. A coating composition according to claim 21 or 22, wherein said anhydride is methyl hexahydrophthalic anhydride.

24. A coating composition according to claim 18, wherein said diepoxide is selected from the group consisting of:
 (i) condensation products of bisphenol-A with epichlorohydrin, (ii) ester diepoxides, (iii) cycloaliphatic diepoxides, and (iv) mixtures of (i)-(iii).

25. A coating composition according to claim 18, wherein said amine-aldehyde crosslinking agent is selected from the group consisting of condensation products of formaldehyde with melamine, substituted melamine, urea, benzoquamine and substituted benzoquanamine, and mixtures of said condensation products in an amount sufficient to provide between about 0.75 and about 3.75 equivalents of nitrogen crosslinking functionality for each equivalent of hydroxy functionality included in said composition either on said tetrahydroxy oligomer or as a hydroxyl group of said hydroxy functional additive.

26. A coating composition according to claim 18, wherein said hydroxy functional additive is a polyol selected from the group consisting of (i) hydroxy functional polyesters, (ii) hydroxy functional polyethers, (iii) hydroxy functional oligoesters, (iv) monomeric polyols, (v) hydroxy functional copolymers formed from monoethylenically unsaturated monomers, one or more of which bears hydroxy functionality and which is included in said copolymer in amounts ranging from about 10 to about 50 weight percent of said copolymer, and (vi) mixtures of (i)–(v).

* * * * *